United States Patent
Yamamoto

(10) Patent No.: US 10,892,844 B2
(45) Date of Patent: Jan. 12, 2021

(54) COMMUNICATION DEVICE, COMMUNICATION SYSTEM, COMMUNICATION APPARATUS, AND COMMUNICATION METHOD

(71) Applicant: NEC Corporation, Tokyo (JP)

(72) Inventor: Tetsuya Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/487,906

(22) PCT Filed: Mar. 16, 2018

(86) PCT No.: PCT/JP2018/010513
§ 371 (c)(1),
(2) Date: Aug. 22, 2019

(87) PCT Pub. No.: WO2018/180611
PCT Pub. Date: Oct. 4, 2018

(65) Prior Publication Data
US 2020/0244386 A1    Jul. 30, 2020

(30) Foreign Application Priority Data

Mar. 29, 2017  (JP) ................. 2017-064359

(51) Int. Cl.
*H04J 14/02*  (2006.01)
*H04B 10/275*  (2013.01)
*H04B 10/40*  (2013.01)

(52) U.S. Cl.
CPC ........ *H04J 14/0221* (2013.01); *H04B 10/275* (2013.01); *H04B 10/40* (2013.01)

(58) Field of Classification Search
None
See application file for complete search history.

(56) References Cited

U.S. PATENT DOCUMENTS

2004/0247312 A1  12/2004  Hasuo et al.
2012/0106968 A1*  5/2012  Nakamura .......... H04J 14/0221
                                                                    398/79

(Continued)

FOREIGN PATENT DOCUMENTS

EP         3273626 A1    1/2018
JP       2013-157655 A    8/2013

(Continued)

OTHER PUBLICATIONS

Inoue T et al: "In-service upgrade method for DWDM submarine cable system using ASE dummy lights", Optical Fiber Communication Conference, 2004, IEEE, vol. 1, Feb. 23, 2004 (Feb. 23, 2004), pp. 202-204, XP010744374, ISBN: 978-1-55752-772-1.

(Continued)

*Primary Examiner* — David W Lambert

(57) ABSTRACT

In order to enable more stable monitoring of communication status, a communication device is provided with: a setting unit which sets a first wavelength selected from wavelength selection alternatives included in wavelengths of light included in dummy light, and a first transmission power which is selected in accordance with a first communication status from a plurality of transmission power selection alternatives that are set in advance; a generation unit which generates light of the first wavelength from the dummy light; an adjustment unit which adjusts the light of the first wavelength to first light of the first transmission power; and a multiplexing unit which multiplexes the first light with communication light serving as light for a predetermined communication so as not to overlap each other on the time axis, and which delivers the multiplexed light to another communication device.

18 Claims, 6 Drawing Sheets

(56) References Cited

U.S. PATENT DOCUMENTS

| | | | | |
|---|---|---|---|---|
| 2013/0259475 A1* | 10/2013 | Ji | ............... | H04Q 11/00 |
| | | | | 398/48 |
| 2014/0286635 A1* | 9/2014 | Kaneko | ............ | H04B 10/564 |
| | | | | 398/34 |
| 2018/0212707 A1 | 7/2018 | Yamamoto | | |

FOREIGN PATENT DOCUMENTS

| | | | | |
|---|---|---|---|---|
| WO | 03/049330 A1 | 6/2003 | | |
| WO | WO-2016147655 A1 * | 9/2016 | ........... | H04B 10/291 |
| WO | 2017/013875 A1 | 1/2017 | | |
| WO | WO-2017013875 A1 * | 1/2017 | ............ | H04B 10/07 |
| WO | 2017/168994 A1 | 10/2017 | | |

OTHER PUBLICATIONS

Extended European Search Report for EP Application No. EP18774694.6 dated on Mar. 25, 2020.

International Search Report for PCT Application No. PCT/JP2018/010513, dated Jun. 12, 2018.

English translation of Written opinion for PCT Application No. PCT/JP2018/010513.

* cited by examiner

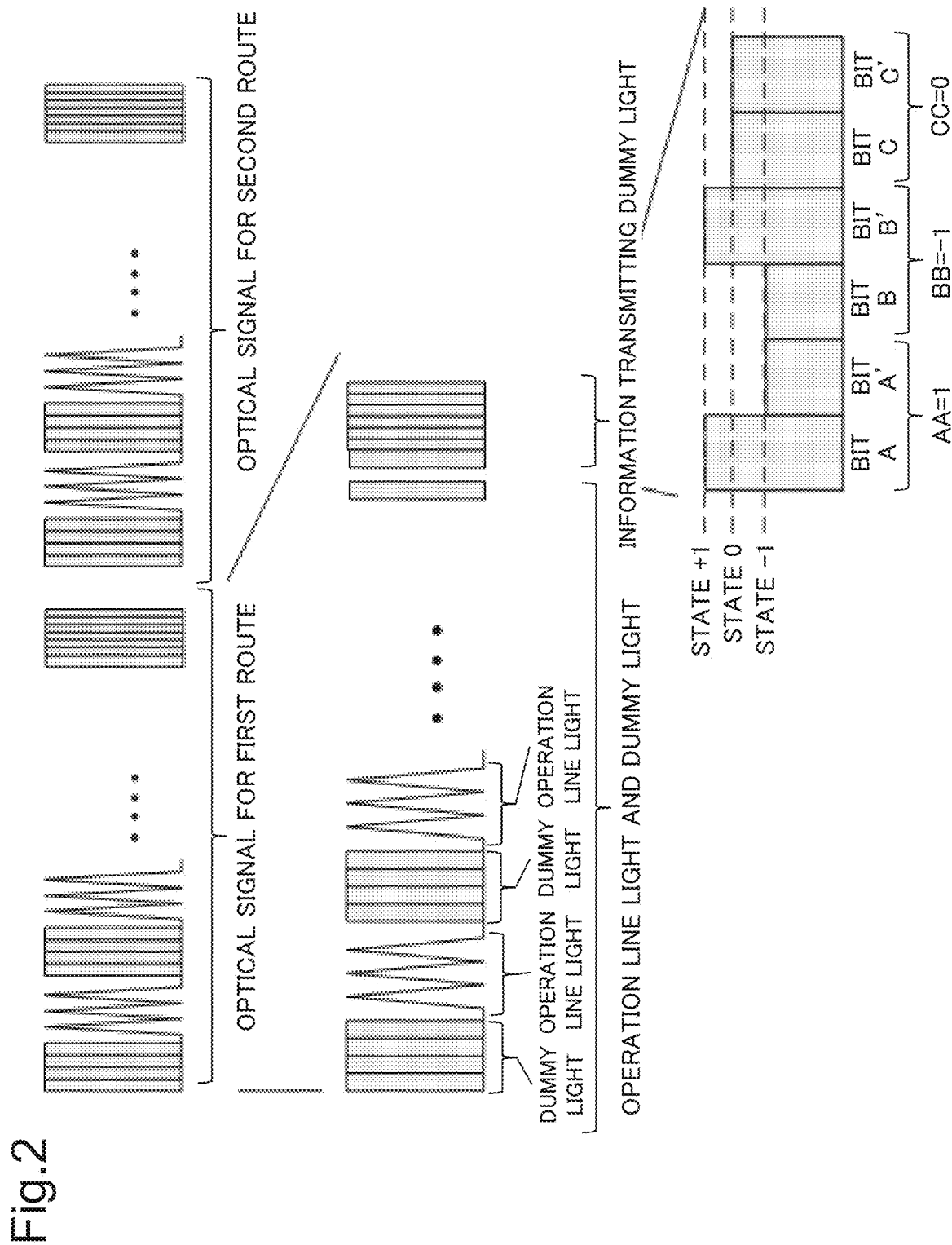

Fig.3

| FIRST INFORMATION AA | SECOND INFORMATION BB | THIRD INFORMATION CC | CONTENTS INDICATED BY INFORMATION LISTED IN LEFT COLUMNS |
|---|---|---|---|
| -1 | -1 | -1 | TRANSMISSION IS ABNORMAL, RECEPTION IS ABNORMAL, TERMINAL 101a |
| -1 | -1 | 0 | TRANSMISSION IS ABNORMAL, RECEPTION IS ABNORMAL, TERMINAL 101b |
| -1 | -1 | +1 | TRANSMISSION IS ABNORMAL, RECEPTION IS ABNORMAL, TERMINAL 101c |
| -1 | 0 | -1 | TRANSMISSION IS ABNORMAL, RECEPTION IS NORMAL, TERMINAL 101a |
| -1 | 0 | 0 | TRANSMISSION IS ABNORMAL, RECEPTION IS NORMAL, TERMINAL 101b |
| -1 | 0 | +1 | TRANSMISSION IS ABNORMAL, RECEPTION IS NORMAL, TERMINAL 101c |
| -1 | +1 | -1 | reserve |
| -1 | +1 | 0 | reserve |
| -1 | +1 | +1 | reserve |
| 0 | -1 | -1 | TRANSMISSION IS NORMAL, RECEPTION IS ABNORMAL, TERMINAL 101a |
| 0 | -1 | 0 | TRANSMISSION IS NORMAL, RECEPTION IS ABNORMAL, TERMINAL 101b |
| 0 | -1 | +1 | TRANSMISSION IS NORMAL, RECEPTION IS ABNORMAL, TERMINAL 101c |
| 0 | 0 | -1 | TRANSMISSION IS NORMAL, RECEPTION IS NORMAL, TERMINAL 101a |
| 0 | 0 | 0 | TRANSMISSION IS NORMAL, RECEPTION IS NORMAL, TERMINAL 101b |
| 0 | 0 | +1 | TRANSMISSION IS NORMAL, RECEPTION IS NORMAL, TERMINAL 101c |
| 0 | +1 | -1 | reserve |
| 0 | +1 | 0 | reserve |
| 0 | +1 | +1 | reserve |
| +1 | -1 | -1 | reserve |
| +1 | -1 | 0 | reserve |
| +1 | -1 | +1 | reserve |
| +1 | 0 | -1 | reserve |
| +1 | 0 | 0 | reserve |
| +1 | 0 | +1 | reserve |
| +1 | +1 | -1 | reserve |
| +1 | +1 | 0 | reserve |
| +1 | +1 | +1 | reserve |

COMMUNICATION DEVICE, COMMUNICATION SYSTEM, COMMUNICATION APPARATUS, AND COMMUNICATION METHOD

This application is a National Stage Entry of PCT/JP2018/010513 filed on Mar. 16, 2018, which claims priority from Japanese Patent Application 2017-064359 filed on Mar. 29, 2017, the contents of all of which are incorporated herein by reference, in their entirety.

TECHNICAL FIELD

The present invention relates to a method for monitoring a communication status.

BACKGROUND ART

With advancement of a high speed, a large capacity, and multiple functions in a wavelength-division multiplexing transmission system, a more complicated ring configuration and a more complicated mesh configuration have been introduced. As the configurations have become more complicated, monitoring of a communication status in a transmission path has become more important.

Accordingly, the communication status of the entire wavelength-division multiplexing transmission system is monitored by a monitoring device. In this case, as a communication method, inline communication using overhead communication between terminal devices, or outline communication using a dedicated line outside a device is used.

Note that PTL 1 discloses a band-pass filtering means and a wavelength-division multiplexing transmission device that multiplexes signal light which has a single wavelength achieved by modulating transmission data or multiplexed wavelengths, with signal light being transmitted by the band-pass filtering means, and outputs the multiplexed signal light.

In addition, PTL 2 discloses an optical communication system which includes a plurality of optical transmission devices and has a configuration in which two adjacent optical transmission devices are connected by a current transmission path and a standby transmission path and one of the optical transmission paths transmits an optical signal.

CITATION LIST

Patent Literature

[PTL 1] Japanese Unexamined Patent Application Publication No. 2013-157655
[PTL 2] International Publication No. WO 2003/049330

SUMMARY OF INVENTION

Technical Problem

However, the method of monitoring the entire wavelength-division multiplexing transmission system by the monitoring device has a problem that communication is disabled when a failure occurs in a case of using inline communication. The method has another problem that, since communication is established across countries in a case of using outline communication, the communication quality may become unstable.

An object of the present invention is to provide a communication system and the like that enable stable monitoring of a communication status.

Solution to Problem

A communication device of the present invention includes: a setting means for setting a first wavelength being selected from wavelength selection alternatives included in wavelengths of light included in dummy light, and a first transmission power being selected according to a first communication status from a plurality of transmission power selection alternatives set in advance; a generation means for generating light of the first wavelength from the dummy light; an adjustment means for adjusting light of the first wavelength to first light of the first transmission power; and a multiplexing means for transmitting multiplexed light to another communication device, the multiplexed light being achieved by multiplexing the first light with communication light serving as light for a predetermined communication in such a way as not to overlap each other on a time axis, in which the another communication device acquires the first communication status from a first reception power serving as a reception power of the first light.

Advantageous Effects of Invention

A communication system and the like according to the present invention enable more stable monitoring of a communication status.

BRIEF DESCRIPTION OF DRAWINGS

FIG. 2 is a conceptual diagram illustrating an optical signal used for a first route and an optical signal used for a second route;

FIG. 3 is a table of content examples illustrating a combination of first information, second information, and third information;

EXAMPLE EMBODIMENT

Figure 1:
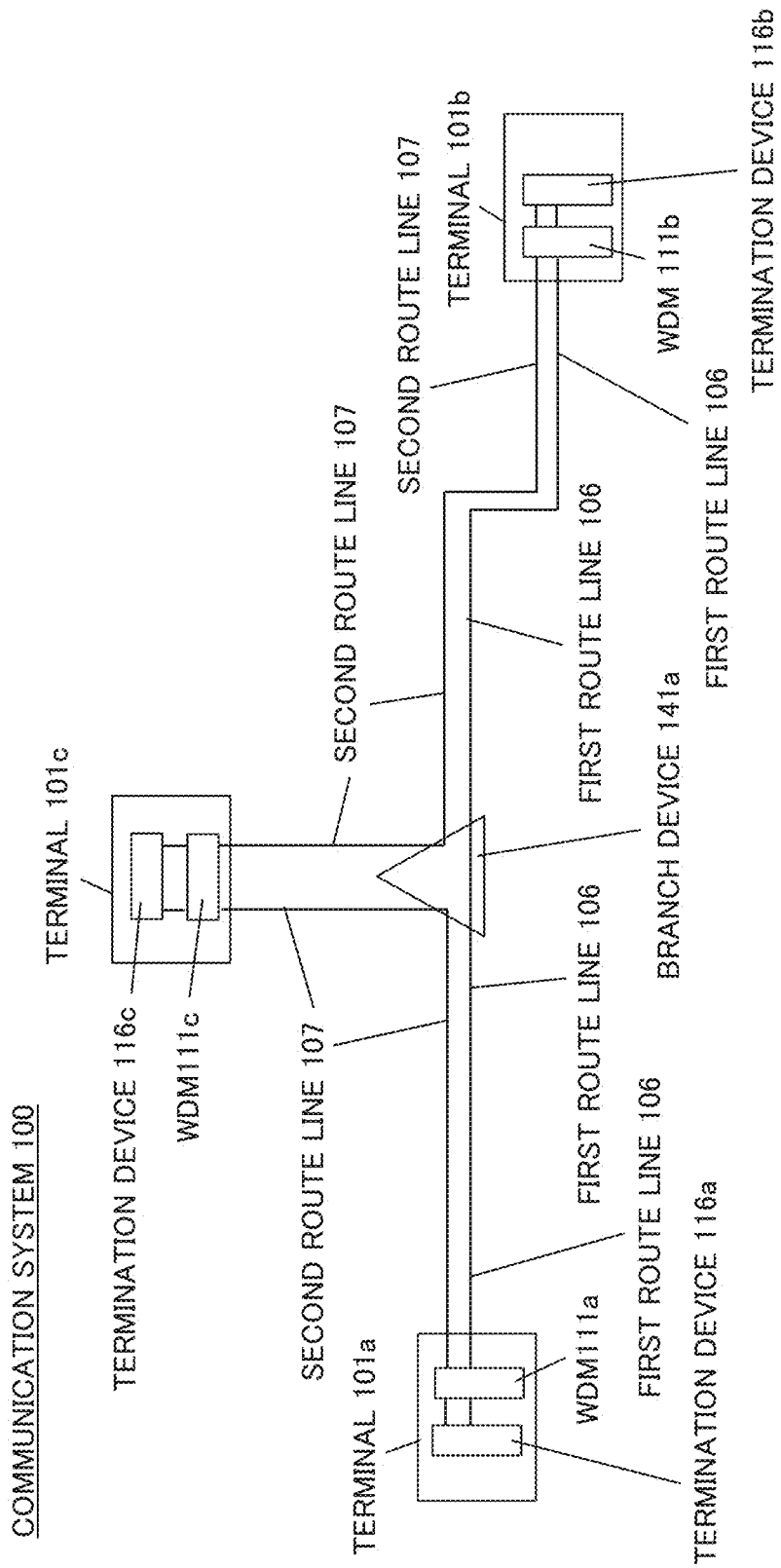
FIG. 1 is a conceptual diagram illustrating a configuration example of a communication system according to an example embodiment of the present invention.

FIG. 1 is a conceptual diagram illustrating a configuration of a communication system 100 as an example of a communication system according to an example embodiment of the present invention.

The communication system 100 is, for example, a cable system that is assumed to be applied to a submarine cable.

The communication system 100 includes terminals 101a to 101c and a branch device 141a.

The terminal 101a includes a termination device 116a and a WDM 111a. The term "WDM" used herein refers to a wavelength-division multiplexing device. These also hold true for the following description.

Further, the terminal 101a holds own identification information in a recording unit which is not illustrated.

The termination device 116a converts an externally input electrical signal into a predetermined optical signal in the WDM 111a, and then transmits the optical signal to the terminal 101b.

The termination device 116a performs the transmission of the signal to the terminal 101b in the following two routes for the same signal.

A first one of the two routes is a first route through a first route line 106. In the first route, the optical signal transmitted by the WDM 111a is transmitted to the terminal 101b without passing through the terminal 101c.

A second one of the two routes is a second route through a second route line 107. In the second route, the optical signal transmitted from the WDM 111a passes through the terminal 101c and is then transmitted to the terminal 101b.

The termination device 116a converts the electrical signal transmitted from the WDM 111a, and outputs the converted signal to the outside.

The WDM 111a converts the electrical signal input from the termination device 116a into an optical signal of a predetermined wavelength. The WDM 111a selects a wavelength of an optical signal into which the electrical signal is converted, and generates the optical signal of the wavelength. The WDM 111a converts another electrical signal input at the same time into an optical signal of another wavelength. The WDM 111a superimposes optical signals of a plurality of wavelengths generated at the same time, and inputs the optical signals to an optical cable.

The terminal 101b includes a termination device 116b and a WDM 111b.

The terminal 101b is described by replacing the terminal 101a with the terminal 101b, the termination device 116a with the termination device 116b, and the WDM 111a with the WDM 111b in the above description of the terminal 101a.

The terminal 101c includes a termination device 116c and a WDM 111c.

The terminal 101b is described by replacing the terminal 101a with the terminal 101c, the termination device 116a with the termination device 116c, and the WDM 111a with the WDM 111c in the above description of the terminal 101a.

FIG. 2 is a conceptual diagram illustrating optical signals which are transmitted from the terminal 101a illustrated in FIG. 1 and are used for a first route and a second route.

The optical signal output for the first route and the optical signal output for the second route from the terminal 101a are at the same level at the same timing.

Further, the both optical signals include a series of optical signals, which are formed by repetition of dummy light and operation line light, and information transmitting dummy light.

The information transmitting dummy light includes a plurality of arbitrary wavelengths in ASE dummy light divided at predetermined wavelength intervals. Further, at each bit included in the information transmitting dummy light, power of light at each wavelength is set to a plurality of values. A combination of light power of the plurality of wavelengths of the information transmitting dummy light enables transmission of an evaluation result of a communication status associated with optical communication in each terminal to another terminal.

Dummy light for transmitting information is composed of six consecutive bits, more specifically, bit A, bit A', bit B, bit B', bit C, and bit C'. Further, each bit can take three values, i.e., a +1 state, a 0 state, and a −1 state.

A combination of bit A and bit A' represents first information AA. States of bit A and bit A' are inverted. Specifically, when bit A and bit A' are averaged, a state "0" is attained. In this manner, two bits which are inverted from each other represent one piece of information, thereby making it possible to suppress variations in the information transmitting dummy light and power of the optical signal including the information transmitting dummy light.

As illustrated in FIG. 2, in a state where the combination of the state of bit A and the state of bit A' indicates 1 and −1, it is assumed that the combination of bit A and bit A' indicates that, for example, the first information AA is −1.

On the other hand, although not illustrated in FIG. 2, when the states of bit A and bit A' both indicate 0, the combination indicates that the first information AA is 0.

Further, it is assumed that the first information AA of −1 indicates that, for example, a transmission status in a terminal represented by third information CC to be described below is abnormal. Also, it is assumed that the first information AA of 0 indicates that, for example, the transmission status in the terminal represented by the third information CC to be described below is normal.

Note that in the combination of the state where bit A and bit A' indicate +1 and the state where bit A and bit A' indicate −1, different pieces of information may be represented based on which one of bit A and bit A' is +1. In this case, for example, the first information AA acquired when bit A is +1 can be configured to indicate that the transmission status in the terminal is normal. Further, the first information AA acquired when bit A' is +1 can be configured to indicate that, for example, the transmission status in the terminal is unknown.

A combination of bit B and bit B' represents second information BB. States of bit B and bit B' are inverted. Specifically, when bit B and bit B' are averaged, a state "0" is attained. In this manner, two bits which are inverted from each other represent one piece of information, thereby making it possible to suppress variations in the information transmitting dummy light and power of the optical signal including the information transmitting dummy light.

As illustrated in FIG. 2, when the state of bit B is −1 and the state of bit B' is +1, the combination of bit B and bit B' indicates that the second information BB is −1.

On the other hand, although not illustrated in FIG. 2, when the states of bit B and bit B' both indicate 0, it is assumed that the combination indicates that, for example, the second information BB is 0.

Further, it is assumed that the second information of −1 indicates that, for example, a reception status in a terminal represented by the third information to be described below is abnormal. Also, it is assumed that the second information of 0 indicates that, for example, the reception status in the terminal is normal.

Note that in the combination of the state where bit B and bit B' indicate +1 and the state where bit B and bit B' indicate −1, different pieces of information may be represented based on which one of bit B and bit B' is 1. In this case, for example, the second information acquired when bit B is 1 can be configured to indicate that the reception status in the terminal is normal. Further, the second information acquired when bit B' is 1 can be configured to indicate that, for example, the reception status in the terminal is unknown.

A combination of bit C and bit C' represents the third information CC. States of bit C and bit C' are inverted. Specifically, when bit C and bit C' are averaged, a state "0" is attained. In this manner, two bits which are inverted from each other represent one piece of information, thereby making it possible to suppress variations in the information transmitting dummy light and power of the optical signal including the information transmitting dummy light.

In a case where both bit C and bit C' indicate a state of 0, the combination of bit C and bit C' indicates that the third information CC is 0.

Although not illustrated in FIG. 2, when the state of bit C indicates +1 and the state of bit C' indicates −1, the third information CC indicates +1.

Although not illustrated in FIG. 2, when the state of bit C indicates −1 and the state of bit C' indicates +1, the third information CC indicates −1.

It is assumed that the third information of −1 indicates that the transmission status represented by the first information and the reception status represented by the second information are associated with, for example, the terminal 101a.

Further, it is assumed that the third information of 0 indicates that the transmission status represented by the first information and the reception status represented by the second information are associated with, for example, the terminal 101b.

Further, it is assumed that the third information of +1 indicates that the transmission status represented by the first information and the reception status represented by the second information are associated with, for example, the terminal 101c.

Note that the ASE dummy light for representing information is selected from among a group of ASE dummy light wavelengths included in the same route.

It is assumed that in the information transmitting dummy light illustrated in FIG. 2, light of a wavelength λ1 selected from the ASE dummy light is used for bit A. Also, it is assumed that light of a wavelength λ2 selected from the ASE dummy light is used for bit A'. Also, it is assumed that light of a wavelength λ3 selected from the ASE dummy light is used for bit B. Also, it is assumed that light of a wavelength λ4 selected from the ASE dummy light is used for bit B'. Also, it is assumed that light of a wavelength λ5 selected from the ASE dummy light is used for bit C. Also, it is assumed that light of a wavelength λ6 selected from the ASE dummy light is used for bit B.

Then, in the information transmitting dummy light illustrated in FIG. 2, the state of bit A(λ1) indicates +1, the state of bit A'(λ2) indicates −1, the state of bit B(λ3) indicates −1, the state of bit B'(λ4) indicates +1, the state of bit C(λ5) indicates 0, and the state of bit C'(λ6) indicates 0. The total power of the bits A, A', B, B', C, and C' becomes a state of 0.

The above-described configuration also holds true for a case where the combination of bit A and bit A', the combination of bit B and bit B', and the combination of bit C and bit C' represent information of any one of −1, 0, and +1.

As a method for monitoring a communication status, monitoring a communication status based on ON/OFF of ASE dummy light can be considered. However, when it is determined whether the communication status is acceptable or not by using only ON/OFF of the ASE dummy light, the dummy light passes through a plurality of relays even when the dummy light is interrupted, which may lead to an increase in the power of the ASE. In this case, there is a need for providing a power difference in each logical value in consideration of an increase in the power of the ASE.

In the case where one piece of information is represented by using a combination of a certain bit and an inverted bit thereof as described above, even when a certain amount of noise or the like is superimposed on the information transmitting dummy light, information indicating the combination can be discriminated depending on a difference in power between two adjacent bits. Accordingly, the above-described problem can be solved by representing one piece of information using the combination.

Note that the interval between wavelengths of ASE dummy light that is selected for the information transmitting dummy light has a high degree of freedom in theory. The interval between wavelengths is desirably set to, for example, about 25 Ggrid, in consideration of deterioration in waveform caused by transmission of the dummy light.

It is assumed that the three-valued interval for the information transmitting dummy light is, for example, 5 dB.

Note that, for dummy light of one wavelength, power set per wavelength can also be set to four or more values.

FIG. 3 is a table of content examples illustrating a combination of the first information AA, the second information BB, and the third information CC described above. Descriptions of each column in FIG. 3 are obvious to those illustrated in FIG. 2, and thus the descriptions are omitted. Note that "reserve" illustrated in FIG. 3 represents that combinations of the corresponding first information AA, second information BB, and third information CC are not used in the communication system 100 illustrated in FIG. 1. These combinations can also be used as described above.

Next, a configuration example of each terminal in which the terminal 101a illustrated in FIG. 1 transmits the signals illustrated in FIG. 2 to the terminal 101b.

Figure 4:
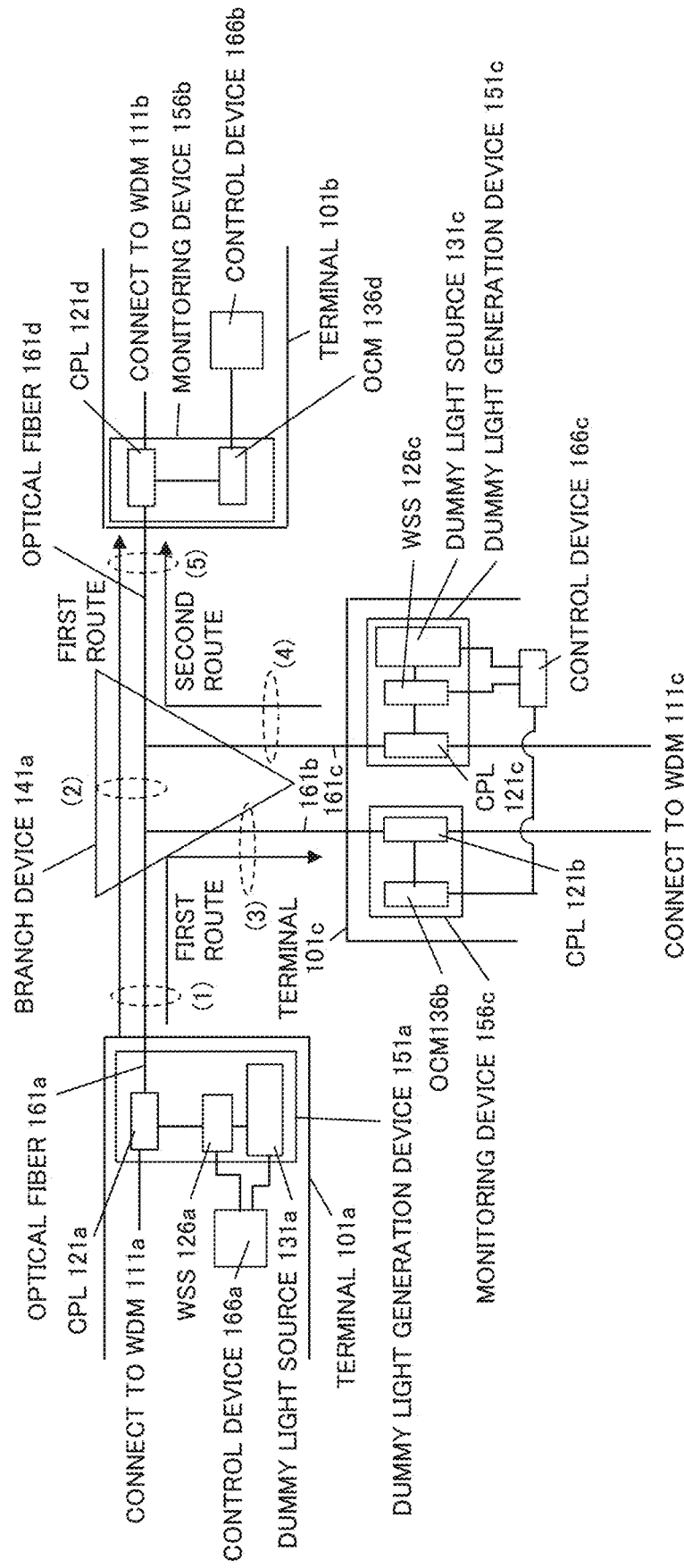
FIG. 4 is a conceptual diagram illustrating a configuration example of each terminal for transmitting signals illustrated in FIG. 2 to a terminal 101b.

FIG. 4 is a conceptual diagram illustrating a configuration example of each terminal for transmitting the signals illustrated in FIG. 2 to the terminal 101b.

The terminal 101a includes a control device 166a and a dummy light generation device 151a, in addition to the termination device 116a and the WDM 111a illustrated in FIG. 1.

The dummy light generation device 151a includes a CPL 121a, a WSS 126a, and a dummy light source 131a. The term "CPL" used herein is an abbreviation for a coupler. Further, the term "WSS" is an abbreviation for a wavelength selective switch.

The control device 166a causes the dummy light source 131a to generate the ASE dummy light by using, for example, an externally input signal. The term "ASE" used herein is an abbreviation for amplified spontaneous emission.

Further, the control device 166a instructs the WSS 126a to select a predetermined number of wavelengths. The wavelengths correspond to, for example, the combination of bit A and bit A', the combination of B and bit B', and the combination of bit C and bit C' illustrated in FIG. 2. Further, the control device 166a instructs the WSS 126a to generate the information transmitting dummy light.

The dummy light source 131a generates the ASE dummy light in accordance with the instruction from the control device 166a. The dummy light source 131a inputs the generated ASE dummy light to the WSS 126a.

The WSS 126a selects a plurality of wavelengths in accordance with the instruction from the control device 166a. Further, the WSS 126a acquires light of the selected wavelengths from the ASE dummy light in accordance with the instruction from the control device 166a. The WSS 126a adjusts power of the acquired light of each wavelength. Then, the WSS 126a generates the information transmitting dummy light by combining the light of each wavelength with adjusted power as illustrated in FIG. 2.

The WSS 126a inputs the generated information transmitting dummy light to the CPL 121a at a predetermined timing. The timing is a timing when the information transmitting dummy light is inserted in such a way as not to overlap operation line light and dummy light on a time axis at the position illustrated in FIG. 2.

Further, the WSS 126a inputs the ASE dummy light received from the dummy light source 131a to the CPL 121a at a predetermined timing. The timing is a timing when the dummy light is inserted in such a way as not to overlap the operation line light and information transmitting dummy light on a time axis at the position illustrated in FIG. 2.

The CPL 121a couples the dummy light and information transmitting dummy light transmitted from the WSS 126a with the optical signal (operation line light illustrated in FIG. 2) supplied from the WDM 111a. Further, the CPL 121a inputs the coupled optical signal to an optical fiber 161a. As described above, the dummy light and information transmitting dummy light transmitted from the WSS 126a and each optical signal transmitted from the WDM 111a are adjusted in such a way as not to overlap each other on a time axis.

The terminal 101b includes a control device 166b and a monitoring device 156b, in addition to the WDM 111b and the termination device 116b illustrated in FIG. 1.

The control device 166b causes an OCM 136d to evaluate the quality of the optical signal input from a CPL 121d. The term "OCM" used herein is an abbreviation for optical channel monitor. Further, the control device 166b performs predetermined processing based on the information which is transmitted from the OCM 136d and is read from the information transmitting dummy light. The processing includes, for example, an output of a content indicated by the information.

Further, the control device 166b performs predetermined processing based on the result of evaluating the quality of the optical signal that is transmitted from the OCM 136d and is input from the CPL 121d. The processing includes, for example, an output of the evaluation result.

The monitoring device 156b includes the CPL 121d and the OCM 136d.

The CPL 121d inputs the optical signal input from an optical fiber 161d to each of the WDM 111b and the OCM 136d.

The OCM 136d evaluates the quality of the optical signal input from the CPL 121d in accordance with the instruction from the control device 166b. The OCM 136d sends the evaluation result to the control device 166b.

Further, the OCM 136d reads information (see the first to third information illustrated in FIG. 3) included in the above-described information transmitting dummy light included in the optical signal input from the CPL 121d in accordance with the instruction from the control device 166b. The OCM 136d transmits the read information to the control device 166b.

The terminal 101c includes a control device 166c, a monitoring device 156c, and a dummy light generation device 151a, in addition to the termination device 116c and the WDM 111c illustrated in FIG. 1.

The control device 166c causes a dummy light source 131c to generate the ASE dummy light by using an externally input signal.

Further, the control device 166c instructs a WSS 126c to select a predetermined number of wavelengths. The wavelength selection includes selection of a wavelength for generating the above-described information transmitting dummy light.

Further, the control device 166c instructs the WSS 126c to generate the above-described information transmitting dummy light.

Further, the control device 166c performs predetermined processing on the information which is transmitted from an OCM 136b and is read from the above-described information transmitting dummy light. The processing includes, for example, an output of a content indicated by the information.

The monitoring device 156c includes a CPL 121b and the OCM 136b.

The CPL 121b inputs the optical signal input from the optical fiber 161b to each of the WDM 111c and the OCM 136b.

The OCM 136b evaluates the quality of the optical signal input from the CPL 121b in accordance with the instruction from the control device 166c. The OCM 136b sends the evaluation result to the control device 166c.

Further, the OCM 136b reads information (see first to third information illustrated in FIG. 3) included in the above-described information transmitting dummy light included in the optical signal input from the CPL 121b in accordance with the instruction from the control device 166c. The OCM 136b transmits the read information to the control device 166c.

The dummy light generation device 151c includes a CPL 121c, the WSS 126c, and the dummy light source 131c.

The dummy light source 131c generates the ASE dummy light in accordance with the instruction from the control device 166c. The dummy light source 131c inputs the generated ASE dummy light to the WSS 126c.

The WSS 126c selects the instructed number of wavelengths in accordance with the instruction from the control device 166c. Further, the WSS 126c extracts light of the selected wavelengths from the ASE dummy light in accordance with the instruction from the control device 166c. Then, the WSS 126c adjusts power of the extracted light. Further, the WSS 126c generates information transmitting dummy light (see the information transmitting dummy light illustrated in FIG. 2).

The WSS 126c inputs the generated information transmitting dummy light to the CPL 121c at a predetermined timing. The timing is a timing when the information transmitting dummy light is inserted at the position illustrated in FIG. 2. When the information transmitting dummy light is inserted at the timing, the information transmitting dummy light does not overlap the operation line light and dummy light illustrated in FIG. 2 on the time axis.

Further, the WSS 126c inputs the ASE dummy light input from the dummy light source 131c to the CPL 121c at a predetermined timing. The timing is a timing when the dummy light is inserted at the position illustrated in FIG. 2. When the dummy light is inserted at the timing, the dummy light does not overlap the operation line light and information transmitting dummy light illustrated in FIG. 2 on the time axis.

The CPL 121c multiplexes the optical signal transmitted from the WSS 126c with the optical signal (the operation line light illustrated in FIG. 2) transmitted from the WDM 111c, and inputs the multiplexed light to an optical fiber 161c. The optical signal transmitted from the WSS 126c and the optical signal transmitted from the WDM 111c are adjusted in such a way as not to overlap each other on the time axis as described above.

Figure 5:
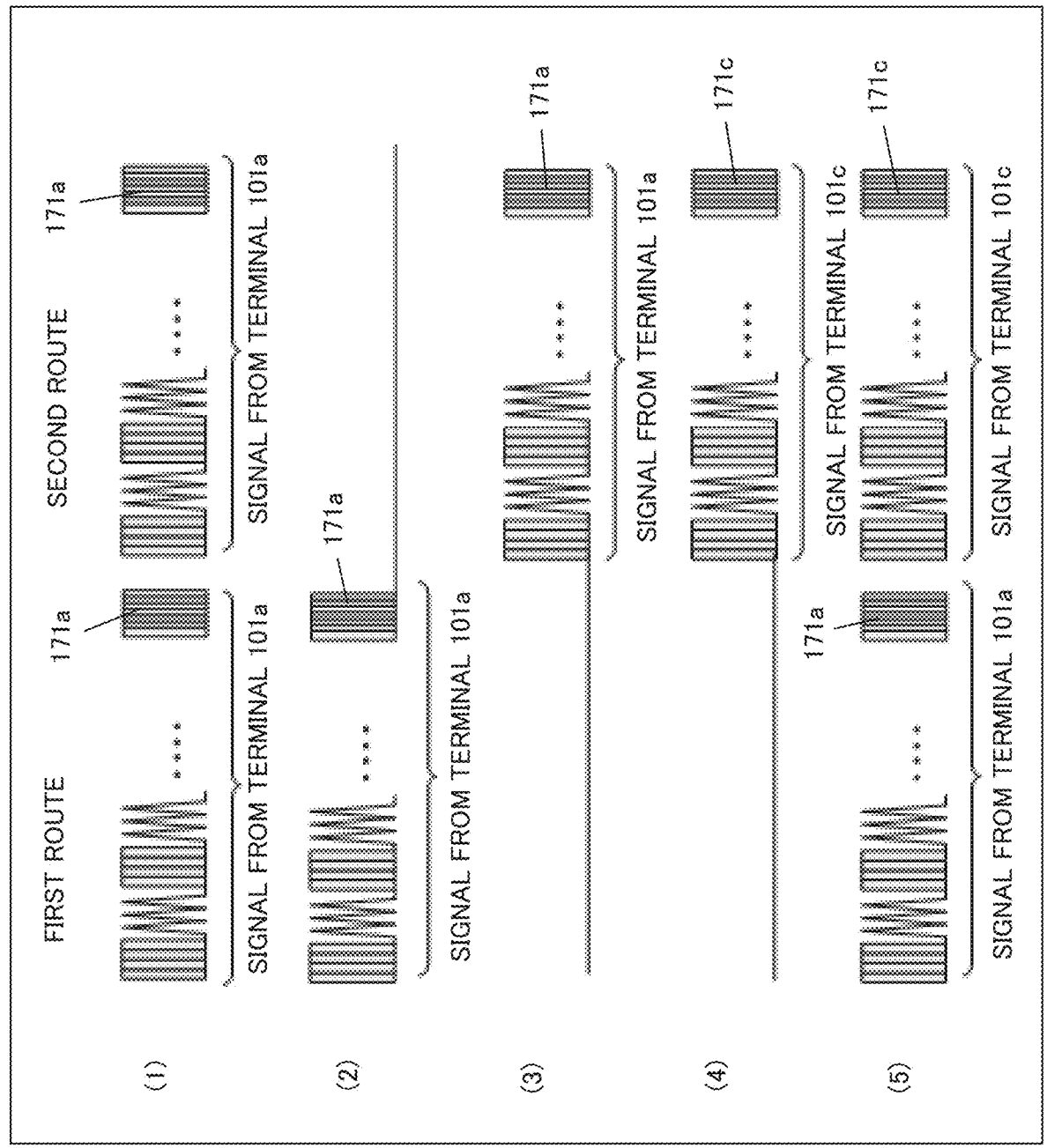
FIG. 5 is an image diagram illustrating an optical signal at each of stages (1) to (5) illustrated in FIG. 4.

FIG. 5 is an image diagram illustrating an optical signal at each of stages (1) to (5) illustrated in FIG. 4.

At the stage (1), an optical signal that passes through an optical fiber in the first route and the optical signal that passes through the optical fiber in the second route are the same optical signal input from the terminal 101a to the optical fiber 161a. Information transmitting dummy light 171a included in the optical signal represents an evaluation result (monitoring information) of a communication status by the terminal 101a illustrated in FIG. 4.

At the stage (2), only the optical signal for the first route passes through the optical fiber. The information transmitting dummy light 171a included in the signal represents monitoring information about the communication status by the terminal 101a.

At the stage (3), only the optical signal for the second route passes through the optical fiber. The information transmitting dummy light 171a included in the signal represents monitoring information about the communication status by the terminal 101a.

At the stage (4), only the optical signal for the second route passes through the optical fiber. Information transmitting dummy light 171c included in the signal represents monitoring information about the communication status by the terminal 101c. The information transmitting dummy light 171c may be different from the information transmitting dummy light 171a.

At the stage (5), there are two types of optical signals that pass through the optical fiber, i.e., the optical signal for the first route and the optical signal for the second route. The optical signal for the first route includes the information transmitting dummy light 171a representing the monitoring information about the communication status by the terminal 101a. The optical signal for the second route includes the information transmitting dummy light 171c representing the monitoring information about the communication status by the terminal 101c.

The terminal 101b illustrated in FIG. 4 receives the optical signal achieved at the stage (5) illustrated in FIG. 5. Further, the terminal 101b acquires an evaluation result of a communication status by the terminal 101a which is indicated by the information transmitting dummy light 171a included in the optical signal for the first route, and an evaluation result of the communication status by the terminal 101a which is indicated by the information transmitting dummy light 171c included in the optical signal for the second route.

Thus, the terminal 101b can compare, for example, the evaluation result of the communication status by the terminal 101a with the evaluation result of the communication status by the terminal 101c.

Note that, as a device having a termination function of the information transmitting dummy signal by using a spectrum monitor in the OCM included in a reception terminal, it may be difficult for each control device to instantaneously determine the communication status of another terminal in real time. This is because when the communication status of another terminal is acquired only once, the communication status of the other terminal cannot accurately indicate the communication status in some cases. In this case, the control device checks, for example, whether the communication status of the other terminal matches a plurality of times in succession. Consequently, the control device can stably monitor the communication status of the other terminal.

Note that a transmission system according to this example embodiment can also include a device that requires automatic switching when a redundant configuration is constructed. In this case, the transmission system can also include information representing a switching request and a warning state from another terminal in the information transmitting dummy light described above. In this case, the transmission system is capable of bidirectional switching.

Advantageous Effects

Each terminal transmits monitoring information about the communication status by the terminal to another terminal by using information transmitting dummy signal. The information transmitting dummy signal is a combination of a plurality of information represented by setting power of a wavelength selected from wavelengths included in an ASE dummy signal to multiple values.

When monitoring information is transmitted to another terminal, the other terminal does not require interposition of the monitoring device described above in the Background Art section. Accordingly, each terminal can more stably recognize the communication status as compared with the method of monitoring the entire wavelength-division multiplexing transmission system by a monitoring device.

Further, the wavelengths used for the information transmitting dummy signal can be arbitrarily changed. Therefore, wavelengths can be uniquely set among all wavelengths by aligning a wavelength position of a transmission-side terminal with a wavelength position of a reception-side terminal.

Furthermore, in the communication system according to the present invention, there is no need that a function is added to a relay device or the like. Accordingly, in the communication system, there is no need that a component is added to the relay device. In many cases, it is assumed that the relay device is sunk onto the bottom of the sea. Therefore, replacement of the relay device requires a lot of labor and cost. The communication system can eliminate the need for a lot of labor and cost.

Figure 6:
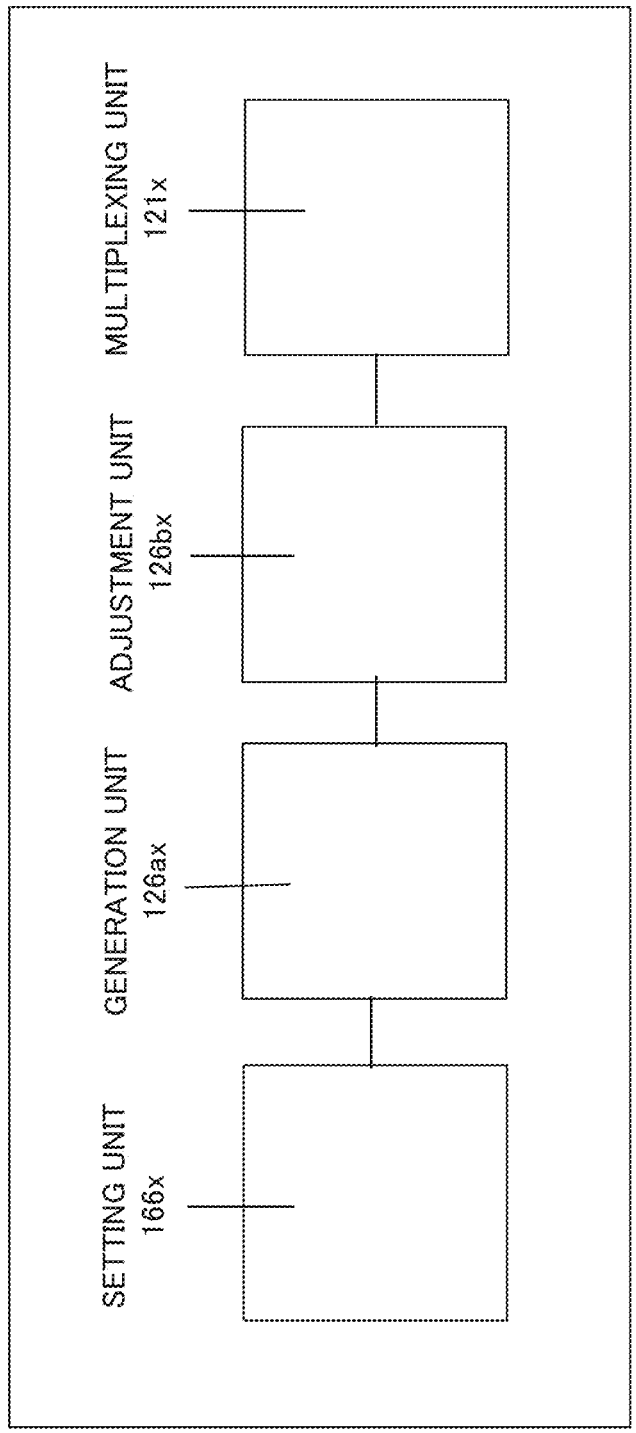
FIG. 6 is a block diagram illustrating a minimum configuration of a communication device according to an example embodiment of the present invention.

FIG. 6 is a block diagram illustrating a configuration of a communication device 101x as a minimum configuration of the communication device according to this example embodiment.

The communication device 101x includes a setting unit 166x, a generation unit 126ax, an adjustment unit 126bx, and a multiplexing unit 121x.

The setting unit 166x sets a first wavelength selected from wavelength selection alternatives included in wavelengths of light included in dummy light, and a first transmission power selected in accordance with a first communication status from a plurality of transmission power selection alternatives set in advance.

The generation unit 126ax generates light of the first wavelength from the dummy light.

The adjustment unit 126bx adjusts light of the first wavelength to first light of the first transmission power.

The multiplexing unit 121x transmits the multiplexed light, which is achieved by multiplexing the first light with communication light serving as light for a predetermined communication in such a way as not to overlap each other on a time axis, to another communication device which is not illustrated.

The other communication device acquires the first communication status from a first reception power serving as a reception power of the first light.

The communication device 101x transmits the first light, which is achieved by adjusting a transmission power of the light of the first wavelength generated from the dummy light in such a way as to represent the communication status of the communication device 101x, to the other communication device. The other communication device acquires the first communication status of the communication device 101*x* by using a reception power of the first light.

No monitoring device is used to acquire the communication status in the communication device 101*x* by the other communication device. Accordingly, the problem inherent in the method of monitoring the entire wavelength-division multiplexing transmission system by the monitoring device as described above in the [Technical Problem] section does not occur in the acquisition.

Accordingly, the other communication device enables the communication device 101*x* to more stably monitor the communication status.

Consequently, with the configuration, the communication device 101*x* can achieve the advantageous effects described in the [Advantageous Effects of Invention] section.

While example embodiments of the present invention are described above, the present invention is not limited to the example embodiments. Further modifications, replacements, or adjustments can be added without departing from the basic technical idea of the present invention. For example, the configurations of elements illustrated in the drawings are merely examples for facilitating the understanding of the present invention, and the configurations are not limited to those illustrated in the drawings.

The whole or part of the example embodiments disclosed above can be described as, but not limited to, the following supplementary notes.

Note that in the following Supplementary notes, "first light" is, more specifically, light corresponding to, for example, any one of bit A, bit A', and a combination of bit A and bit A' illustrated in FIG. 2. Alternatively, "first light" is, more specifically, light corresponding to, for example, any one of bit B, bit B', and a combination of bit B and bit B' illustrated in FIG. 2.

Further, "1st-1 light" is, more specifically, light corresponding to, for example, one of bit A and bit A' illustrated in FIG. 2. Alternatively, "1st-1 light" is, more specifically, light corresponding to, for example, one of bit B and bit B' illustrated in FIG. 2.

Further, "1st-1 transmission power" is a transmission power of the 1st-1 light.

Further, "1st-2 light" is, more specifically, light that is not the 1st-1 light out of the light corresponding to bit A and the light corresponding to bit A' illustrated in FIG. 2, for example, when the 1st-1 light is light corresponding to one of bit A and bit A'. Alternatively, "1st-2 light" is, more specifically, light that is not the 1st-1 light out of the light corresponding to bit B and the light corresponding to bit B' illustrated in FIG. 2, for example, when the 1st-1 light is light corresponding to one of bit B and bit B'.

Further, 1st-2 transmission power is a transmission power of the 1st-2 light.

Further, "second light" is, more specifically, light corresponding to, for example, any one of bit C, bit C', and a combination of bit C and bit C' illustrated in FIG. 2.

Further, "2nd-1 light" is, more specifically, light corresponding to, for example, one of bit C and bit C' illustrated in FIG. 2.

Further, 2nd-1 transmission power is a transmission power of the 2nd-1 light.

Further, "2nd-2 light" is, more specifically, light that is not the 2nd-1 light, for example, out of the light corresponding to bit C and the light corresponding to bit C' illustrated in FIG. 2.

Further, "2nd-2 transmission power" is a transmission power of the 2nd-2 light.

Further, "third light" is, more specifically, light corresponding to, for example, any one of bit A, bit A', and a combination of bit A and bit A' illustrated in FIG. 2. Alternatively, "first light" is, more specifically, light corresponding to, for example, any one of bit B, bit B', and a combination of bit B and bit B' illustrated in FIG. 2.

Further, "3rd-1 light" is, more specifically, light corresponding to, for example, one of bit A and bit A' illustrated in FIG. 2. Alternatively, "3rd-1 light" is, more specifically, light corresponding to, for example, one of bit B and bit B' illustrated in FIG. 2.

Further, "3rd-1 transmission power" is a transmission power of the 3rd-1 light.

Further, "3rd-2 light" is, more specifically, light that is not the 3rd-1 light out of the light corresponding to bit A and the light corresponding to bit A' when the 3rd-1 light is light corresponding to one of bit A and bit A' illustrated in FIG. 2. Alternatively, "3rd-2 light" is, more specifically, light that is not the 3rd-1 light out of the light corresponding to bit B and the light corresponding to bit B' when the 3rd-1 light is light corresponding to one of bit B and bit B' illustrated in FIG. 2.

Further, "3rd-2 transmission power" is a transmission power of the 3rd-2 light.

(Supplementary Note 1)

A communication device including:

a setting means for setting a first wavelength being selected from wavelength selection alternatives included in wavelengths of light included in dummy light, and a first transmission power being selected according to a first communication status from a plurality of transmission power selection alternatives set in advance;

a generation means for generating light of the first wavelength from the dummy light;

an adjustment means for adjusting light of the first wavelength to first light of the first transmission power; and a multiplexing means for transmitting multiplexed light to another communication device, the multiplexed light being achieved by multiplexing the first light with communication light serving as light for a predetermined communication in such a way as not to overlap each other on a time axis, in which the another communication device acquires the first communication status from a first reception power serving as a reception power of the first light.

(Supplementary Note 2)

The communication device according to Supplementary note 1, in which the first light is a combination of 1st-1 light of a 1st-1 transmission power and 1st-2 light of a 1st-2 transmission power in such a way as not to overlap each other on a time axis, the 1st-2 light being achieved by inverting the 1st-1 light with respect to an average transmission power.

(Supplementary Note 3)

The communication device according to Supplementary note 1 or 2, further including a first acquisition means for acquiring the first communication status.

(Supplementary Note 4)

The communication device according to Supplementary note 3, in which the first acquisition means includes an optical channel monitor (OCM).

(Supplementary Note 5)

The communication device according to any one of Supplementary notes 1 to 4, in which the first communication status is a reception status.

(Supplementary Note 6)

The communication device according to any one of Supplementary notes 1 to 5, in which the first communication status is a transmission status.

(Supplementary Note 7)

The communication device according to any one of Supplementary notes 1 to 6, in which the communication device includes own identification information, the setting means sets a second wavelength being selected from the wavelength selection alternatives, and a second transmission power being selected according to the identification information from a plurality of communication device selection alternatives set in advance, the generation means generates light of the second wavelength from the dummy light, the adjustment means adjusts light of the second wavelength to second light of the second transmission power, the multiplexing means inputs multiplexed light to an optical fiber being connected to the another communication device, the multiplexed light being achieved by multiplexing the second light with the communication light in such a way as not to overlap each other on a time axis, and the another communication device acquires the identification information from a second reception power serving as a reception power associated with the second light.

(Supplementary Note 8)

The communication device according to Supplementary note 7, in which the second light is a combination of 2nd-1 light of a 2nd-1 transmission power and 2nd-2 light of a 2nd-2 transmission power in such a way as not to overlap each other on a time axis, the 2nd-2 light being achieved by inverting the 2nd-1 light with respect to an average transmission power.

(Supplementary Note 9)

The communication device according to Supplementary note 7, in which the second light is a combination of 2nd-1 light of a 2nd-1 transmission power and 2nd-2 light of a 2nd-2 transmission power in such a way as not to overlap each other on a time axis, the 2nd-2 light being achieved by inverting the 2nd-1 light with respect to a zero-level transmission power.

(Supplementary Note 10)

The communication device according to any one of Supplementary notes 1 to 9, in which the setting means sets a third wavelength being selected from the wavelength selection alternatives, and a third transmission power being selected according to a second communication status from the transmission power selection alternatives, the generation means generates light of the third wavelength from the dummy light, the adjustment means adjusts light of the third wavelength to third light of the third transmission power, the multiplexing means inputs multiplexed light to an optical fiber being connected to the another communication device, the multiplexed light being achieved by multiplexing the third light with the communication light in such a way as not to overlap each other on a time axis, and the another communication device acquires the second communication status from a third reception power serving as a reception power associated with the third light.

(Supplementary Note 11)

The communication device according to Supplementary note 10, in which the third light is a combination of 3rd-1 light of a 3rd-1 transmission power and 3rd-2 light of a 3rd-2 transmission power in such a way as not to overlap each other on a time axis, the 3rd-2 light being achieved by inverting the 3rd-1 light with respect to an average transmission power.

(Supplementary Note 12)

The communication device according to Supplementary note 10, in which the third light is a combination of 3rd-1 light of a 3rd-1 transmission power and 3rd-2 light of a 3rd-2 transmission power in such a way as not to overlap each other on a time axis, the 3rd-2 light being achieved by inverting the 3rd-1 light with respect to a zero-level transmission power.

(Supplementary Note 13)

The communication device according to any one of Supplementary notes 10 to 12, further including a second acquisition means for acquiring the second communication status.

(Supplementary Note 14)

The communication device according to Supplementary note 13, in which the second acquisition means includes an optical channel monitor (OCM).

(Supplementary Note 15)

The communication device according to any one of Supplementary notes 10 to 14, in which the second communication status is a reception status.

(Supplementary Note 16)

The communication device according to any one of Supplementary notes 10 to 15, in which the second communication status is a transmission status.

(Supplementary Note 17)

The communication device according to any one of Supplementary notes 1 to 16, in which the generation means includes a wavelength selective switch (WSS).

(Supplementary Note 18)

The communication device according to any one of Supplementary notes 1 to 17, in which the multiplexing means includes an optical coupler.

(Supplementary Note 19)

A communication system including:

the communication device according to any one of Supplementary notes 1 to 18; and the another communication device.

(Supplementary Note 20)

The communication system according to Supplementary note 19, in which the another communication device includes an acquisition means for acquiring the first communication status from a first reception power serving as a reception power of the first light.

(Supplementary Note 21)

A communication apparatus including an acquisition means for acquiring a first communication status from a first reception power serving as a reception power of first light of a first transmission power which is transmitted from a first communication device, the first transmission power being selected according to the first communication status from a plurality of transmission power selection alternatives set in advance, the first communication device being configured to:

set a first wavelength being selected from wavelength selection alternatives included in wavelengths of light included in dummy light, and the first transmission power;

generate light of the first wavelength from the dummy light;

adjust light of the first wavelength to the first light; and transmit multiplexed light to another communication device, the multiplexed light being achieved by multiplexing the first light with communication light serving as light for a predetermined communication in such a way as not to overlap each other on a time axis.

(Supplementary Note 22)

The communication apparatus according to Supplementary note 21, in which the acquisition means includes an optical channel monitor (OCM) and the OCM acquires the first communication status from the first reception power.

(Supplementary Note 23)

A communication method including:

setting a first wavelength being selected from wavelength selection alternatives included in wavelengths of light included in dummy light, and a first transmission power being selected according to a first communication status from a plurality of transmission power selection alternatives set in advance;

generating light of the first wavelength from the dummy light;

adjusting light of the first wavelength to first light of the first transmission power; and inputting multiplexed light to an optical fiber being connected to another communication device, the multiplexed light being achieved by multiplexing the first light with communication light serving as light for a predetermined communication in such a way as not to overlap each other on a time axis, in which the another communication device acquires the first communication status from a first reception power serving as a reception power of the first light.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-064359 filed on Mar. 29, 2017, the disclosure of which is incorporated herein in its entirety by reference.

REFERENCE SIGNS LIST

100 Communication system
101a, 101b, 101c Terminal
101x Communication device
106 First route line
107 Second route line
111a, 111b, 111c WDM
116a, 116b, 116c Termination device
121a, 121c CPL
121x Multiplexing unit
126a, 126c WSS
126ax Generation unit
126bx Adjustment unit
131a, 131c Dummy light source
141a Branch device
151a, 151c Dummy light generation device
156b, 156c Monitoring device
161a, 161b, 161c Optical fiber
166a, 166b, 166c Control device
166ax Setting unit
171a, 171c Information transmitting dummy light

What is claimed is:

1. A communication device including:

a setting unit configured to set a first wavelength being selected from wavelength selection alternatives included in wavelengths of light included in dummy light, and a first transmission power being selected according to a first communication status from a plurality of transmission power selection alternatives that are preset;

a generation unit configured to generate light of the first wavelength from the dummy light;

an adjustment unit configured to adjust light of the first wavelength to first light of the first transmission power; and a multiplexing unit configured to transmit multiplexed light to another communication device, the multiplexed light being achieved by multiplexing the first light with communication light serving as light for a predetermined communication in such a way as not to overlap each other on a time axis, in which the another communication device acquires the first communication status from a first reception power serving as a reception power of the first light.

2. The communication device according to claim 1, in which the first light is a combination of light of a first transmission power and light of a second transmission power in such a way as not to overlap each other on a time axis, the light of the second transmission power being achieved by inverting the light of the first transmission power with respect to an average transmission power.

3. The communication device according to claim 1, further including a first acquisition unit configured to acquire the first communication status.

4. The communication device according to claim 3, in which the first acquisition unit includes an optical channel monitor (OCM).

5. The communication device according to claim 1, in which the first communication status is a reception status.

6. The communication device according to claim 1, in which the first communication status is a transmission status.

7. The communication device according to claim 1, in which the communication device includes own identification information, the setting unit sets a second wavelength being selected from the wavelength selection alternatives, and a second transmission power being selected according to the identification information from a plurality of communication device selection alternatives that are preset, the generation unit generates light of the second wavelength from the dummy light, the adjustment unit adjusts light of the second wavelength to second light of the second transmission power, the multiplexing unit inputs multiplexed light to an optical fiber being connected to the another communication device, the multiplexed light being achieved by multiplexing the second light with the communication light in such a way as not to overlap each other on a time axis, and the another communication device acquires the identification information from a second reception power serving as a reception power associated with the second light.

8. The communication device according to claim 7, in which the second light is a combination of light of a first transmission power and light of a second transmission power in such a way as not to overlap each other on a time axis, the light of the second transmission power being achieved by inverting the light of the first transmission power with respect to an average transmission power.

9. The communication device according to claim 7, in which the second light is a combination of light of a first transmission power and light of a second transmission power in such a way as not to overlap each other on a time axis, the light of the second transmission power being achieved by inverting the light of the first transmission power with respect to a zero-level transmission power.

10. The communication device according to claim 1, in which
the setting unit sets a wavelength being selected from the wavelength selection alternatives, and a transmission power being selected according to a second communication status from the transmission power selection alternatives,
the generation unit generates light of the wavelength from the dummy light,
the adjustment unit adjusts light of the wavelength to light of the transmission power,
the multiplexing unit inputs multiplexed light to an optical fiber being connected to the another communication device, the multiplexed light being achieved by multiplexing the light with the communication light in such a way as not to overlap each other on a time axis, and
the another communication device acquires the second communication status from a reception power serving as a reception power associated with the light.

11. The communication device according to claim 10, in which the light is a combination of light of a first transmission power and light of a second transmission power in such a way as not to overlap each other on a time axis, the light of the second transmission power being achieved by inverting the light of the first transmission power with respect to an average transmission power.

12. The communication device according to claim 10, in which the light is a combination of light of a first transmission power and light of a second transmission power in such a way as not to overlap each other on a time axis, the light of the second transmission power being achieved by inverting the light of the first transmission power with respect to a zero-level transmission power.

13. The communication device according to claim 10, further including an acquisition unit configured to acquire the second communication status.

14. The communication device according to claim 13, in which the second acquisition unit includes an optical channel monitor (OCM).

15. The communication device according to claim 10, in which the second communication status is a reception status.

16. The communication device according to claim 10, in which the second communication status is a transmission status.

17. A communication apparatus including an acquisition unit configured to acquire a first communication status from a first reception power serving as a reception power of first light of a first transmission power which is transmitted from a first communication device, the first transmission power being selected according to the first communication status from a plurality of transmission power selection alternatives that are preset, the first communication device being configured to:
set a first wavelength being selected from wavelength selection alternatives included in wavelengths of light included in dummy light, and the first transmission power;
generate light of the first wavelength from the dummy light;
adjust light of the first wavelength to the first light; and
transmit multiplexed light to another communication device, the multiplexed light being achieved by multiplexing the first light with communication light serving as light for a predetermined communication in such a way as not to overlap each other on a time axis.

18. A communication method including:
setting a first wavelength being selected from wavelength selection alternatives included in wavelengths of light included in dummy light, and a first transmission power being selected according to a first communication status from a plurality of transmission power selection alternatives that are preset;
generating light of the first wavelength from the dummy light;
adjusting light of the first wavelength to first light of the first transmission power; and
inputting multiplexed light to an optical fiber being connected to communication device, the multiplexed light being achieved by multiplexing the first light with communication light serving as light for a predetermined communication in such a way as not to overlap each other on a time axis, in which
the communication device acquires the first communication status from a first reception power serving as a reception power of the first light.

* * * * *